G. P. METCALF.
ELECTRIC HEATER FOR USE IN CONNECTION WITH WATER COOLED GASOLENE AUTOMOBILES.
APPLICATION FILED DEC. 15, 1913.

1,155,599.

Patented Oct. 5, 1915.

2 SHEETS—SHEET 1.

Witnesses

Inventor
G. P. Metcalf

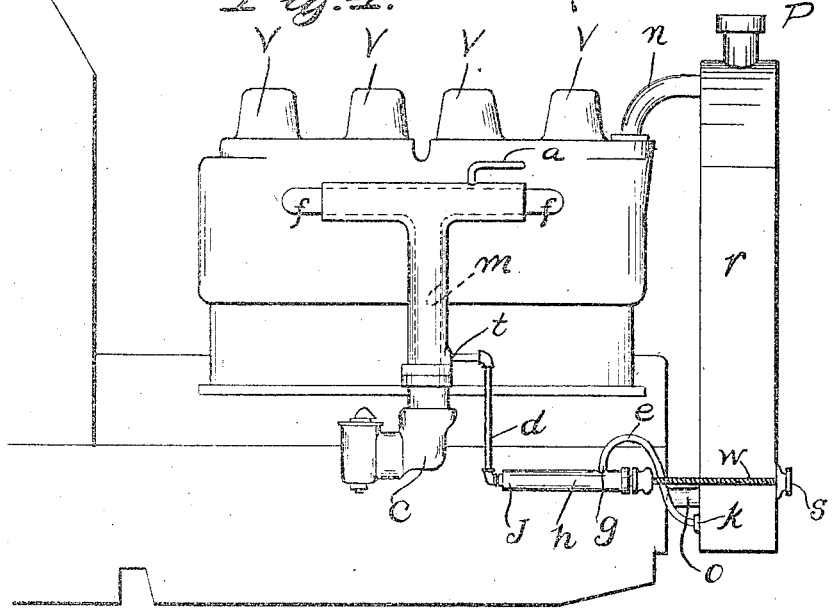
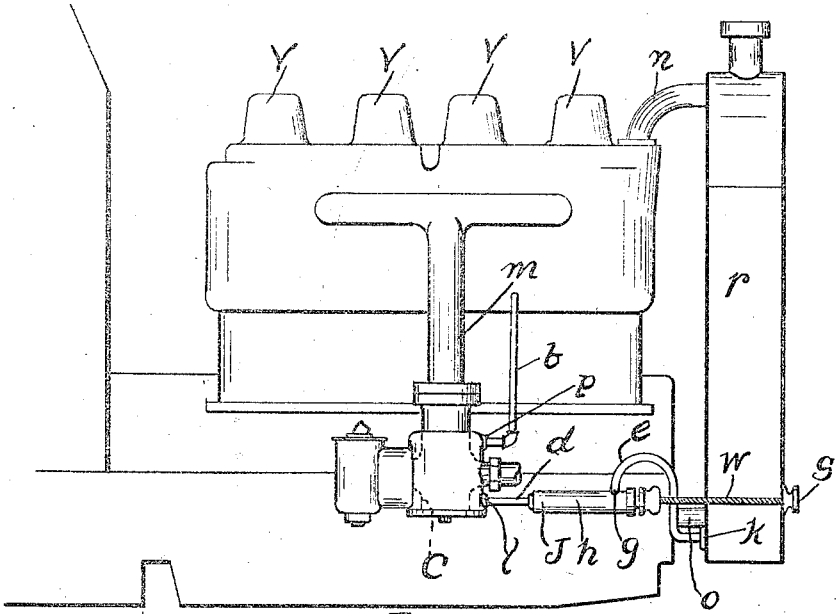

UNITED STATES PATENT OFFICE.

GEORGE P. METCALF, OF ST. PAUL, MINNESOTA.

ELECTRIC HEATER FOR USE IN CONNECTION WITH WATER-COOLED GASOLENE-AUTOMOBILES.

1,155,599.  Specification of Letters Patent.  Patented Oct. 5, 1915.

Application filed December 15, 1913. Serial No. 806,846.

*To all whom it may concern:*

Be it known that I, GEORGE P. METCALF, a citizen of the United States, residing at the city of St. Paul, county of Ramsey, and State of Minnesota, have invented a new and useful Electric Heater for Use in Connection with Water-Cooled Gasolene-Automobiles, of which the following is a specification.

The object of my invention is to heat in a garage, or place of storage, by means of the electric current, furnished by central power stations for residential lighting the water contained in the cooling system of a water-cooled automobile and particularly to heat that portion of the water surrounding the carbureter and the intake manifold thereof and to accomplish this by means of a chamber containing an electric immersion heater, otherwise described as a water-jacket surrounding such a heater, which chamber or water-jacket is permanently inserted in and connected with and made a part of a pipe line connecting the bottom of the automobile radiator with the water-jacket around the carbureter or the intake manifold. By the intake manifold, hereinafter referred to as the manifold, I mean the large pipe connecting the carbureter with the several cylinders of the motor through which pipe passes the mixture of gasolene and air from the carbureter to the cylinders, which mixture when ignited causes the successive explosions in the cylinders. I attain this object by the device illustrated in the accompanying drawing.

Figure 1:
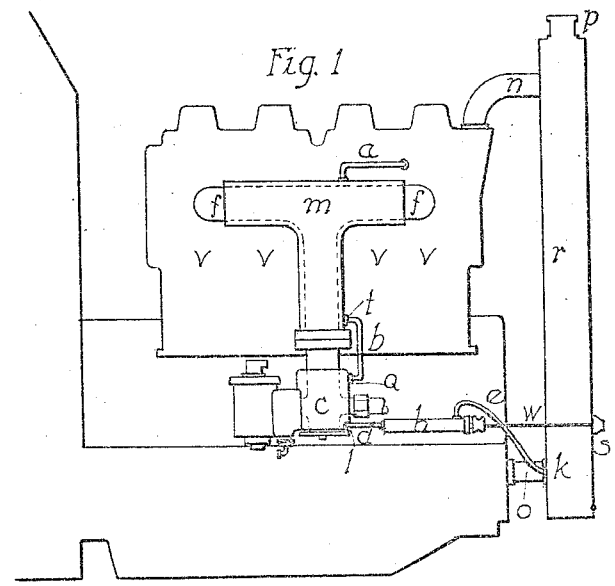
Figure 2:
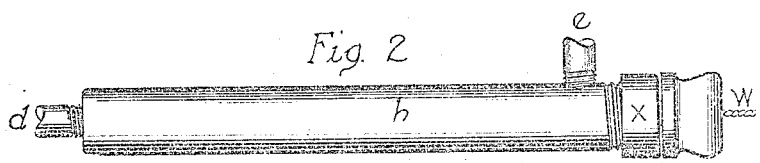
Figure 3:
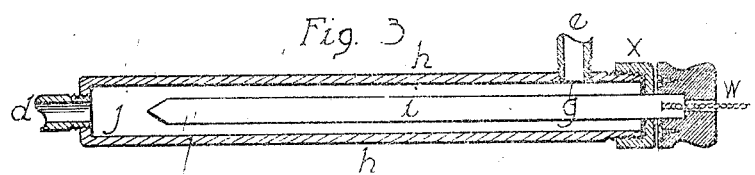

Figure 1, represents in side elevation the relation of the motor, radiator, carbureter and manifold to the device; Fig. 2, represents an elevation of the heating device; Fig. 3, represents a longitudinal cross section of the heating device, and Figs. 4 and 5 represent in side elevation the relation of the motor, radiator, carbureter, manifold and heater when the water jacket is omitted from either around the carbureter or manifold.

In the ordinary water cooled gasolene automobile, in addition to the two large pipes ($n$ and $o$) connecting at the top and bottom of the cooling radiator ($r$) with the water-jackets surrounding the cylinders ($v\ v\ v\ v$) there is usually another small metal pipe $e$ running from an opening ($k$) at the bottom of the radiator ($r$) to an opening ($l$) in the bottom of a water-jacket around the carbureter ($c$), which water-jacket in turn is connected at its top ($q$) by a pipe ($b$) with an opening ($t$) in the bottom of a water-jacket around the manifold ($m$), which water-jacket in turn is connected at its top by another pipe ($a$) with some part of the water-jacket surrounding the cylinders ($v\ v\ v\ v$). In many cars the water-jacket is omitted either from around the manifold ($m$) or from around the carbureter ($c$), in which case the metal pipe, before referred to, runs directly from the opening ($k$) in the bottom of the radiator ($r$) to an opening in the bottom of the water-jacket, either of the carbureter ($l$) or of the manifold ($t$) and from the top thereof to the water-jacket around the cylinders. In Fig. 4 the jacket is omitted from around the carbureter, while in Fig. 5 the jacket is omitted from around the manifold. In Fig. 5 the pipe ($b$) connects the upper end of the circulating chamber of the carbureter ($c$) with the circulating chamber of the engine. The function of these pipes and water-jackets is to circulate the hot water from the cylinder water-jackets so as to raise the temperature of the contents of the carbureter and manifold or either of them and assist vaporization of the gaseous fuel and prevent condensation.

My invention consists of inclosing the heating portion of an electric immersion heater ($i$) of any suitable shape, size or make, in a water tight metal chamber ($h$) or water-jacket, (which chamber or water-jacket has a small opening at either end ($j$ and $g$) or at the top and bottom thereof) and of connecting the chamber ($h$) or water-jacket at these openings with the pipe line running from the opening ($k$) in the base of the radiator ($r$) to the lower opening ($l$) of the water-jacket around the carbureter ($c$) (or with that of the manifold $t$ if the carbureter have no water-jacket) so that the water passing through such line shall pass through such chamber ($h$) or water-jacket, (see Fig. 4).

Hereafter I shall refer to the chamber or water-jacket surrounding the electric immersion heater as the "heating chamber" and the electric immersion heater as the "heating element."

The heating chamber ($h$) should be of metal but may be of any shape or size. While I prefer a heating element ($i$) in the shape of a straight rod, this is not essential and any convenient shape will be practicable. It will be found convenient, but not necessary, to have threaded nipples made to project from the openings ($g$ and $j$) of the heating chamber ($h$). The heating chamber ($h$) should be of ample size to prevent any part of the heating element ($i$) touching the side of the heating chamber ($h$) and to allow free circulation of the water. The heating element ($i$) should be firmly brazed or screwed or otherwise fastened through one end ($x$) of the heating chamber, and the connecting wires ($w$) should project therefrom. I prefer to have the cap ($x$) to which the heating element is affixed screwed to one end of the heating chamber ($h$) rather than to have the heating chamber ($h$) cast in one piece, for the reason that the electric heating element ($i$) is then accessible and can be readily removed, repaired or changed, without disturbance of the heating chamber ($h$).

To install and operate this device, the pipe before referred to, as part of an automobile and as leading from the opening ($k$) in the foot of the radiator ($r$) to the opening ($l$) at the base of the water-jacket of the carbureter ($c$) should be cut. One opening ($j$) of the heating element ($h$) should be joined either directly to the lower opening ($l$) in the water-jacket around the carbureter ($c$) or to that portion of the pipe so cut ($d$) leading directly to the carbureter ($c$). If the manifold alone have a water-jacket (see Fig. 4) then the heating element should be piped from one end to the opening ($k$) in the foot of the radiator ($r$) to the opening and from its other end ($t$) at the base of the water-jacket around the manifold ($m$). Irrespective of whether the opening ($j$) is connected with the water-jacket around the carbureter or manifold, the other opening ($g$) in the heating chamber should be joined to the pipe ($e$) leading to the bottom ($k$) of the radiator ($r$). In this way the chamber ($h$) will be filled with water and the heating element ($i$) completely surrounded by it. There also will be a free passage of water from the radiator ($r$) (see Fig. 1) through the pipe ($e$) and the heating chamber ($h$); thence by the pipe ($d$) to the water-jacket around the carbureter ($c$); thence by the pipe ($b$) to the manifold ($m$); thence by the pipe ($a$) to the water-jacket surrounding the cylinders ($v\ v\ v\ v$). The function of the pipes and water-jackets, as before set forth, will be in no way interrupted or interfered with by the installation of my device.

The wires emerging from the heating element ($w$) may be connected in any convenient manner with the central station electric current. I prefer, however, to run these wires ($w$) through the radiator ($r$) to some standard wall plug receptacle ($s$) permanently fastened to the front of the automobile. To put the device in operation I insert into this receptacle ($s$) a plug connected with the lighting current.

When the heating element ($i$) is connected with a proper current, the hot water generated by contact with the heating element ($i$) in the heating chamber ($h$) will rise through the pipe ($d$) to the water-jacket around the carbureter ($c$); thence through the pipe ($b$) to the water-jacket around the manifold ($m$); thence through the pipe ($a$) to the water-jacket surrounding the cylinders ($v\ v\ v\ v$), and thence circulate through the large pipe connections ($n$ and $o$) to the radiator ($r$) and return by the small pipe ($e$) to the heating chamber ($h$). In this way the heat generated keeps the water surrounding the carbureter ($c$) hot and that surrounding the manifold ($m$) very warm, while that around the engine cylinders ($v\ v\ v\ v$) is kept fairly warm and that in the radiator ($r$) above the freezing point. It will be particularly noted that the heater, carbureter, manifold, engine and radiator are so arranged that the flow of the circulating medium egressing from the heater is in an upward direction, first through the carbureter, and thence through the manifold, engine, radiator and back to the heater, the liquid circulating chambers in said carbureter, manifold and engine being superimposed successively. By thus applying the hottest part of the heating medium to the carbureter and manifold the fuel is most efficiently vaporized so as to explode in the cylinders when ignited. The exact amount of heat given off is determined by the size and by the current consumption of the heating element and may be regulated to suit the wishes of the user.

I am aware that an electric immersion heater has been used to warm the water in the cooling system of water cooled automobiles by dropping it into the neck ($p$) of the radiator ($r$) and that a gas heater is made and sold designed to be hung temporarily in front of the radiator and connected with it by rubber tubes. The advantage attained by the use of my invention over those mentioned is that when once installed it may be put into operation more quickly if the water falls below the level of the upper radiator connection, circulation continues nevertheless; the heat generated goes to the carbureter ($c$), thence to the manifold ($m$), thence to the cylinders ($v\ v\ v\ v$), thence to the radiator ($r$), the importance of heating which parts varies in the order named. In consequence of the above I do not claim the electric immersion heater *per se;* I do not claim the heating of the water in the water cooled automobiles by an electric immersion heater broadly, nor do I claim the water-jacketed feature of an automobile carbureter, manifold or any part or portion of an automobile but

I claim:—

1. The combination with the cylinder and radiator of an explosion engine of pipes between the same to circulate cooling liquid, a heater having a liquid circulating chamber connected with said pipes and a carbureter having a liquid circulating chamber connected with said pipes and situated adjacent to said heater whereby the hottest portion of the circulating liquid passes through said chamber of said carbureter.

2. The combination with the cylinder and radiator of an explosion engine of a duct between the same to circulate a cooling liquid, a carbureter having a liquid circulating chamber and a manifold having a liquid circulating chamber, said liquid circulating chambers of said carbureter and manifold being connected in series with said radiator and cylinder by said duct, and a heater having a liquid circulating chamber connected with said duct and situated adjacent said carbureter, whereby the hottest portion of the circulating liquid is conveyed through said chamber of said carbureter first, for the purpose specified.

3. The combination with the cylinder and radiator of an explosion engine of piping between the same to circulate cooling liquid and a heater and carbureter having liquid circulating chambers connected with said piping, the chamber of said carbureter being placed adjacent the chamber of said heater and below the liquid circulating chamber of said cylinder so that the hottest portion of the circulating liquid passes through the circulating chamber of said carbureter, immediately after egressing from the heater and before passing into the circulating chamber of the cylinder.

4. The combination with an explosive engine comprising a jacketed carbureter, cylinder and a radiator having pipes connecting them in circuit, of a liquid heating chamber interposed in said circuit to deliver primarily into the jacket of said carbureter.

5. The combination with an explosive engine comprising a jacketed carbureter, cylinder and a radiator having pipes connecting them in circuit, of a chamber containing liquid and interposed in said circuit to deliver primarily into the jacket of said carbureter, and an electric heater disposed within said chamber The above specification signed at the city of St. Paul, county of Ramsey and State of Minnesota, this 29th day of November, 1913.

GEO. P. METCALF.

In presence of—
WILLIAM G. GRAVES,
C. C. REED.